United States Patent
Virkar et al.

(10) Patent No.: US 6,770,395 B2
(45) Date of Patent: Aug. 3, 2004

(54) INTERNALLY MANIFOLDED, PLANAR SOLID OXIDE FUEL CELL (SOFC) STACK WITH AN INEXPENSIVE INTERCONNECT

(75) Inventors: Anil Vasudeo Virkar, Salt Lake City, UT (US); David W. Prouse, Salt Lake County, UT (US); Paul C. Smith, Salt Lake City, UT (US); Guang-Young Lin, Salt Lake County, UT (US)

(73) Assignee: Materials and Systems Research, Inc., Salt Lake City, UT (US)

( * ) Notice: Subject to any disclaimer, the term of this patent is extended or adjusted under 35 U.S.C. 154(b) by 366 days.

(21) Appl. No.: 09/974,263

(22) Filed: Oct. 10, 2001

(65) Prior Publication Data

US 2002/0048700 A1 Apr. 25, 2002

Related U.S. Application Data

(60) Provisional application No. 60/242,659, filed on Oct. 23, 2000.

(51) Int. Cl.$^7$ ............................ H01M 8/02; H01M 8/12
(52) U.S. Cl. ............................. 429/34; 429/30; 429/32; 429/40
(58) Field of Search ............................. 429/34, 32, 40, 429/30

(56) References Cited

U.S. PATENT DOCUMENTS

| | | |
|---|---|---|
| 5,543,239 A | 8/1996 | Virkar et al. |
| 6,106,967 A | 8/2000 | Virkar et al. |
| 6,228,521 B1 | 5/2001 | Kim et al. |
| 6,291,089 B1 * | 9/2001 | Piascik et al. ................ 429/17 |

* cited by examiner

Primary Examiner—Patrick Ryan
Assistant Examiner—Angela J. Martin
(74) Attorney, Agent, or Firm—James L. Sonntag

(57) ABSTRACT

A metallic interconnect for use in planar solid oxide fuel cell (SOFC) stacks with metal gauzes disposed in border pieces at the cathodes and anodes providing the electrical conduction between the cell and an interconnect foil and also providing structure for directing gas across the cell surface.

17 Claims, 11 Drawing Sheets

# INTERNALLY MANIFOLDED, PLANAR SOLID OXIDE FUEL CELL (SOFC) STACK WITH AN INEXPENSIVE INTERCONNECT

RELATED APPLICATIONS

Priority is claimed from U.S. Provisional Patent Application 60/242,659, filed Oct. 23, 2000.

STATEMENT REGARDING FEDERALLY SPONSORED RESEARCH OR DEVELOPMENT (Not applicable)

FIELD OF THE INVENTION

This invention relates to planer oxide fuel-cell stacks.

BACKGROUND OF THE INVENTION

In a planar solid oxide fuel cell (SOFC) stack, individual planar cells comprising a tri-layer structure of anode, electrolyte and cathode, are series-connected to a bipolar plate, also referred to as an interconnect. The interconnect must be impervious with no connected porosity to ensure that fuel and air do not mix. At the same time, the interconnect must be an excellent electronic conductor. While considerable work has been reported on ceramic interconnects, it is increasingly believed by many that cost-performance targets will likely be met only if one uses metallic interconnects.

In the design of any planar stack, channels or grooves must be provided in order to allow the transport of gaseous fuel and air across respective anode and cathode surfaces of the cell, with a minimum of resistance to their flow. Usually, this is accomplished by introducing channels or grooves in the interconnect with the cell being smooth or flat, although designs have been proposed wherein grooves or channels are incorporated in the structure of the cell itself, with the interconnect being smooth and flat. In the former design, the required machining considerably increases the cost. In the latter design, the interconnect is merely a thin sheet of an appropriate metallic alloy. However, considerable processing and cost may is associated with the shaping and fabrication of cells with the required grooves or channels.

BRIEF SUMMARY OF THE INVENTION

Clearly, the desired preference is to have both the cells and interconnect flat, from the standpoint of cost. But, at the same time, channels or grooves are required for the transport of gaseous fuel and air. This can be accomplished by configuring interconnect out of physically separate components, all of which are inexpensive.

The present invention is an interconnect that is inexpensive and simple to manufacture, which will materially simplify and lower the cost of SOFC stacks. The interconnect comprises two border pieces, a first and second border piece. Each border piece is of metal and is generally flat. Each is shaped with an internal cutout shaped such that there is an internal cavity with wide margins on opposing sides of the cavity. Within each margin are holes. In the first border piece, the holes are for the passage of reducing gas. In the second border piece the are for the passage of oxidizing gas.

Between the border pieces is disposed an interconnect foil of an electrically conducting material. On its border region are holes for passing reducing gas passage and holes for passing an oxidizing gas passage. The reducing gas passage holes of the interconnect foil are in registration with the reducing gas passage holes of the first border piece and the oxidizing gas passage holes of the interconnect foil are in registration with the oxidizing gas passage holes of the second border piece. Accordingly, the reducing gas passage holes of the interconnect foil allow passage of reducing gas into and out of the cavity of the second border piece, and the oxidizing gas passage holes of the interconnect foil allow passage of oxidizing gas into and out of the cavity of the first border piece.

Disposed in each of the cavities of the first and second border pieces, are wire gauzes, a first and a second metallic wire gauze. When the interconnect is placed in a connecting and sealing position or relationship between two series connected cells in a stack, the first wire gauze provides electrical continuity between an anode cell surface and the surface of the interconnect foil. The second wire gauze likewise provides electrical continuity between an cathode cell surface and the surface of the interconnect foil.

DETAILED DESCRIPTION OF THE INVENTION

The SOFC stack of the present invention comprises a plurality of cells series connected using an interconnect between each cell. The SOFC stack of the present invention can be operated in essentially the same manner as known SOFC stacks, using the same oxidizing and reducing gases. In the discussion below where the term "air" is used it is understood that any suitable fuel-cell oxidizing gas is contemplated, such as oxygen. Where "fuel" is used is understood that any suitable reducing gas, such as hydrogen or a hydrocarbon gas, is contemplated.

Interconnect

In an aspect of the invention the interconnect is metallic, and is made of five parts, two border pieces, an interconnect foil, two assemblies metallic wire gauze or mesh.

Border Pieces

Figure 1A:
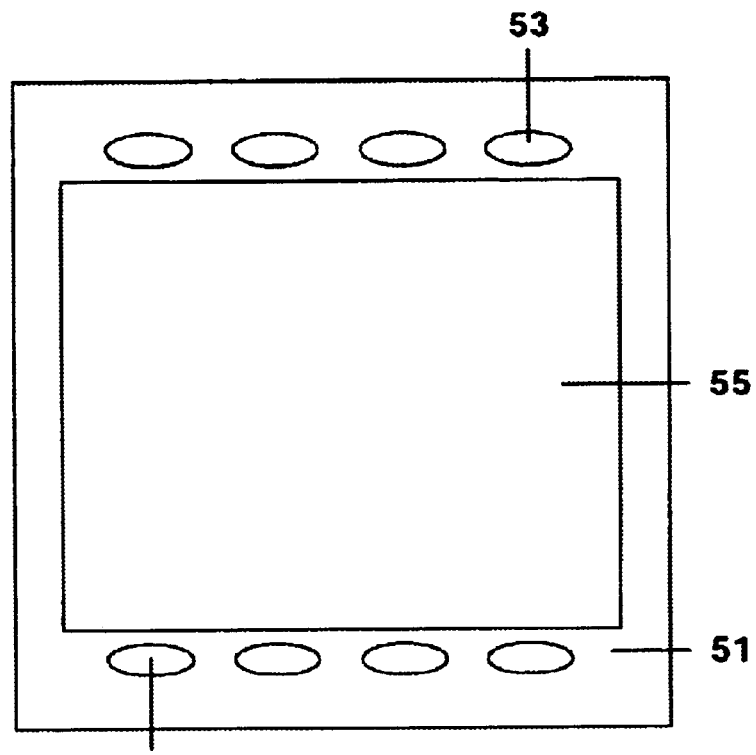
FIG. 1A is a schematic of one of the border pieces showing elliptical holes for fuel passage, and a rectangular cutout for housing the metallic interconnect foil and wire gauze
Figure 1B:
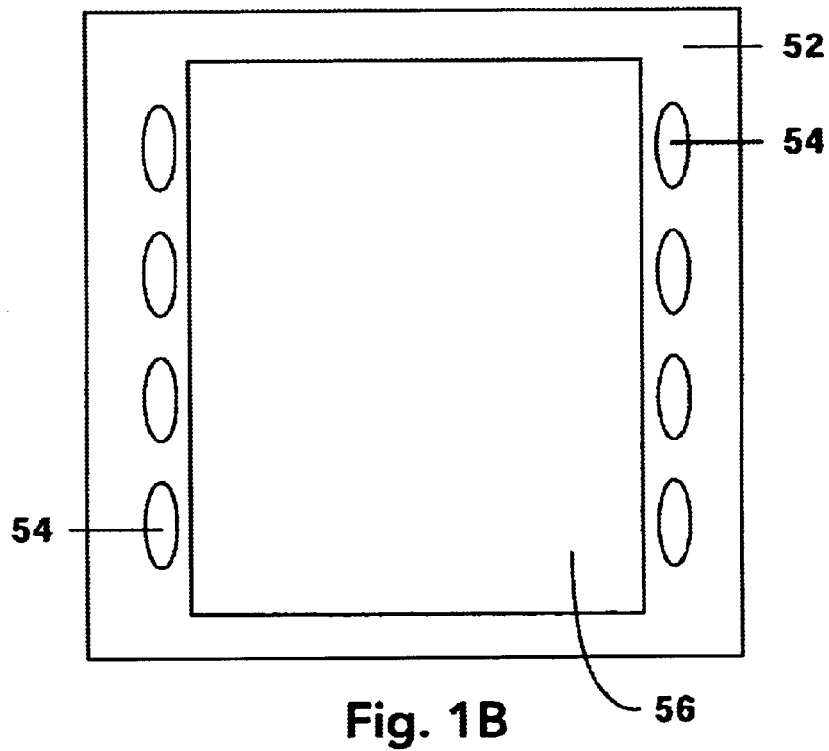
FIG. 1B is a schematic of a similar border piece as in FIG. 1A but with holes for air passage, oriented orthogonally (at an angle of 90°) to the fuel passage holes in FIG. 1A.

Reference is now made to FIGS. 1A and 1B. There are two metallic alloy border, first and second pieces 51, 52 with appropriate holes 53, 54 for fuel and air, respectively. In an aspect of the invention, the thickness of each border piece is about 1/32 inch (0.8 mm) for a cell with a lateral dimension of about 3 inches. It is understood that that the dimensions depend upon the size of the cell. For cells of larger lateral dimensions, for example, the border pieces could be substantially thicker.

Two exemplary border pieces 51, 52 are shown in FIGS. 1A and 1B. These are preferably a metal that is an oxidation-resistant alloy, e.g., a stainless steel, Iconel™ or other suitable, inexpensive alloy that can be made into a sheet form. Suitable ceramic materials may also be used for form the border pieces. The electronic conductivity of any oxide scale of the border pieces is not important, since the only function of this border piece is to serve as a sealing seat, and provide rigidity. No current is required to flow through the border pieces. The outer shape is the same as the outer shape of the cell. Illustrated is an exact square for a square cell, but the cell and border pieces can be of any suitable shape.

The first and second border pieces have respectively cavities or inner cutouts 55, 56 that are of any suitable shape to provide opposing borders. The opposing wider borders have holes 53, 54 (elliptical shown here, although they can be circular, rectangular, ovoid, or of any other suitable shape). In one or the first border piece 51, the holes 53 are for the passage for fuel, and the other or second border piece 52, the holes 54 are for the passage of air. Generally, the shape of the cell and border pieces can be any shape that accommodates the inner cutout and allows borders with holes for gas passage. Square is preferred, but rectangular, or square-like or rectangular-like shapes that may have curved sides or rounded shapes are contemplated.

Interconnect Foil

Figure 1C:
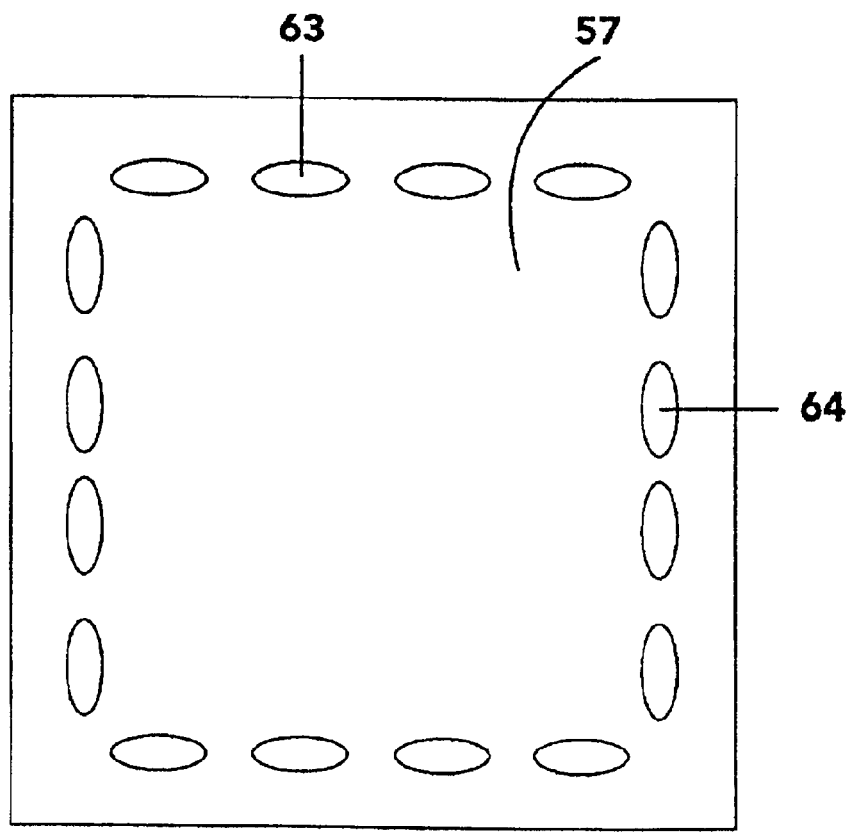
FIG. 1C is a schematic of an interconnect foil or a plate, which is to be sandwiched between the two border pieces.

Reference is now made to FIG. 1C, which shows a metallic interconnect foil 57 made of any suitable metallic alloy that is oxidation-resistant with any oxide scale that forms being an excellent electronic conductor. Such a material may be a stainless steel, superalloy, Haynes™ 230, Iconel™ alloy, ferritic or austenitic alloy, or any of many other alloys. These foils or plates may also be any suitable metal with suitable oxidation-resistant coatings deposited on them.

The term "interconnect foil" is contemplated to include foils, rigid and flexible plates, or other suitable forms, as long as they function and can be formed as described. In addition, the material may be a metal, ceramic, or other material that can be formed into such a foil or plate. For example, the interconnect foil may be made of an electronically conducting ceramic, such as Sr-doped $LaCrO_3$. Even though this component in such a case is made of a brittle and rigid ceramic, it is no longer in contact with a brittle and a rigid cell, thereby alleviating issues regarding thermal and contact stresses. The anticipated thickness of a ceramic component (plate) will be somewhat greater than if it had been a metallic foil.

In what follows, first it will be assumed that this component is made of a metallic foil. However, it is within the skill of a practitioner to use a ceramic component. As further illustrated below, the metallic foil 57 has essentially the same outer dimensions as the border pieces, and has holes 63, 64 corresponding to and registerable with the border holes 53, 54 of the border pieces. The interconnect foil 57 is sandwiched between the two border pieces 51, 52.

Metallic Wire Gauze

Figure 1E:
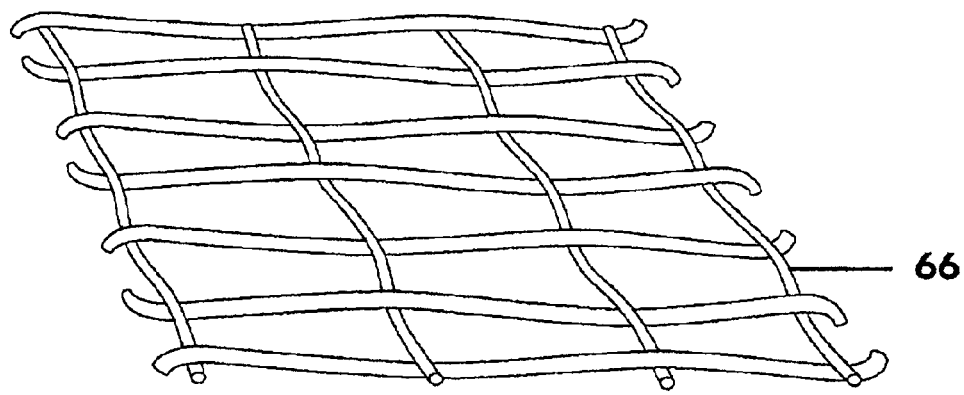
FIGS. 1D and 1E are a schematics of metallic gauze used in the interconnect of the invention.
Figure 1D:
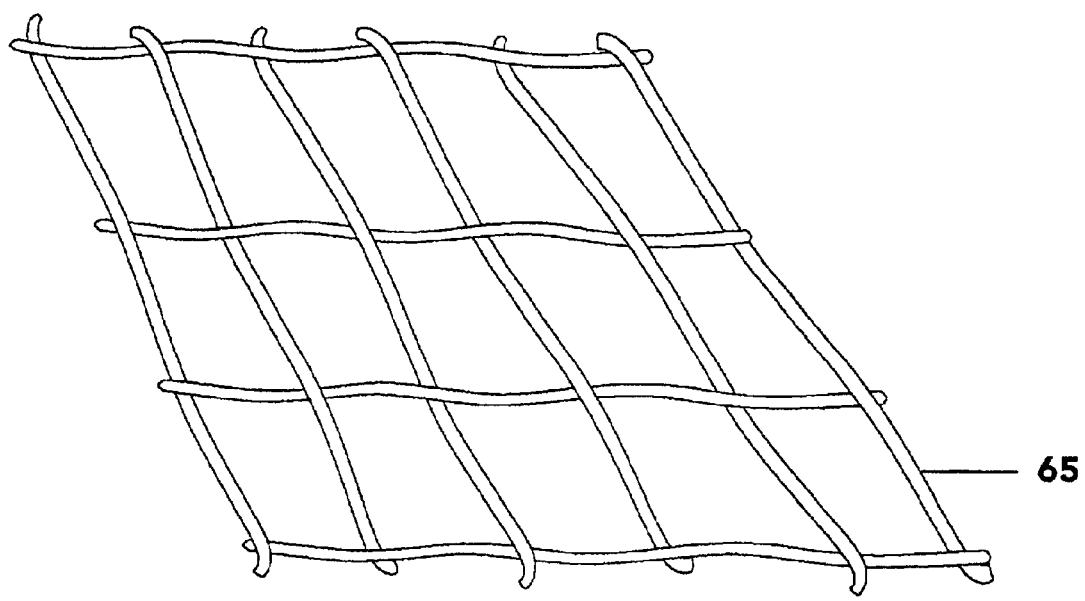

Reference is now made to FIGS. 1D and 1E, which are a schematics of the first wire gauze assembly 65, and the second wire gauze assembly 66. There are a first and second assembly 65, 66 of metallic wire gauze or mesh; one for the anode side, and the other for the cathode side, respectively. These two could be of the same or different materials and have the same or different physical configuration.

For the first gauze 65 adjacent to the anode side, the wire gauze assembly may be of nickel or copper. For the second gauze 66 adjacent to the cathode side, the gauze wire must be of an oxidation-resistant alloy with the oxide scale being a good electronic conductor. Alternatively, the wire gauze for the cathode side may be of silver or a silver-palladium alloy.

The wire gauze assembly 65 or 66 may be in any suitable form, such as a woven wire gauze, as illustrated, a bonded grid of wires, or a gauze of randomly oriented metal fibers, or any other suitable construction that allows the passage of gas across the anode or cathode surface, and also allow for the conduction of electricity between the interconnect foil 57 (FIG. 1C) and the adjacent anode or cathode. A gauze need not be symmetric. For example, as illustrated, wires orthogonal to gas (fuel or air) flow may be thinner with the spacing quite large. The objective of using these thinner wires is to hold the gauze together, without offering too large a resistance to gas flow.

Figure 2A:
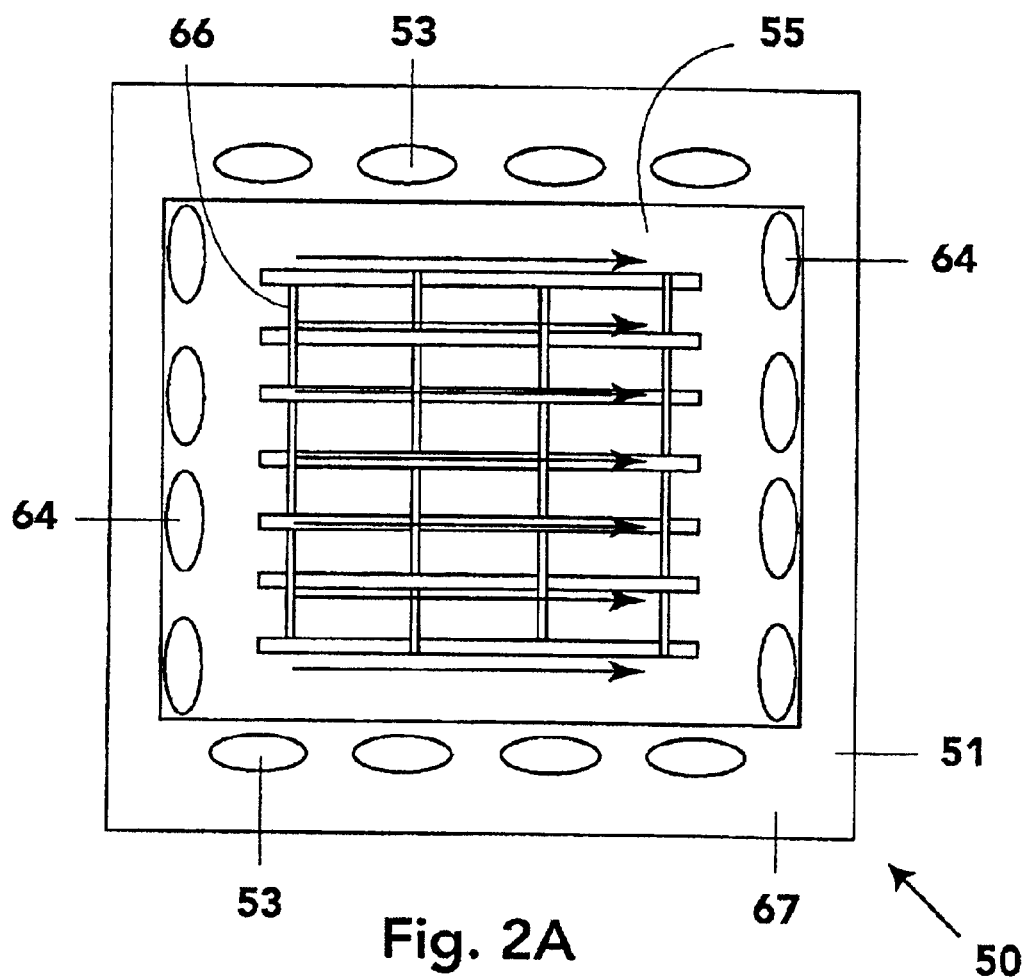
FIGS. 2A and 2B are schematics of an assembled interconnect from the border pieces, interconnect foil and metallic wire gauzes in FIGS. 1A to 1D.
Figure 2B:
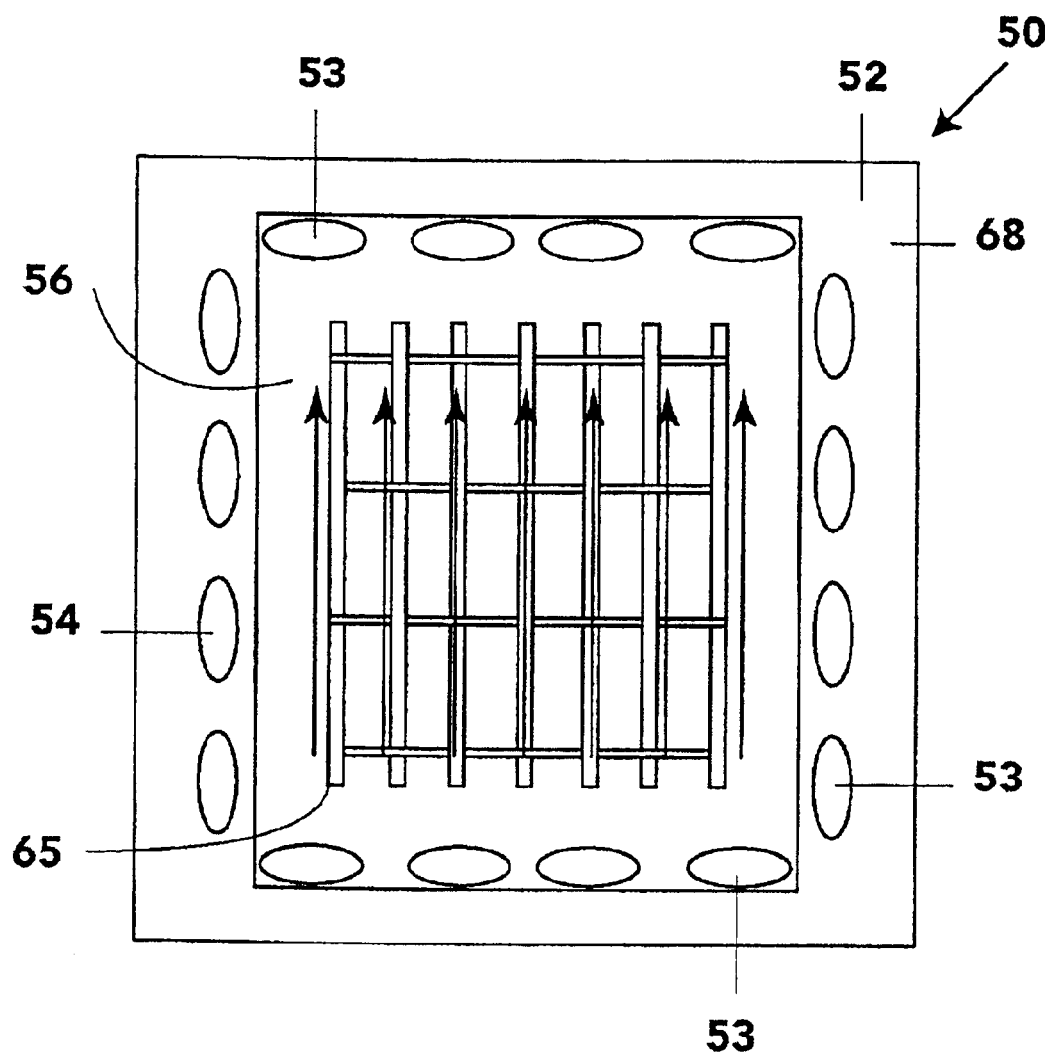
Figure 3:
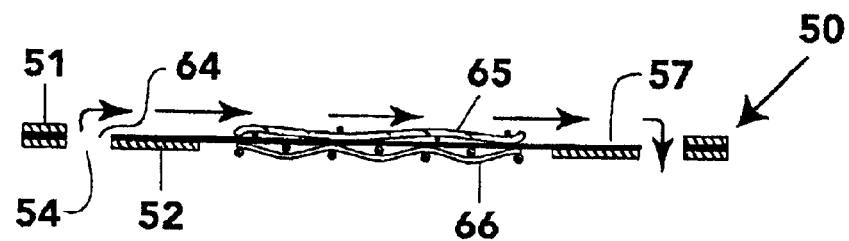
FIG. 3 is schematic cross section of an assembled interconnect of FIGS. 2A and 2B through A—A.

Reference is now made to FIG. 2A, FIG. 2B, which are side views, and FIG. 3, which is a cross-section through A—A of FIGS. 2A and 2B. The figures show an interconnect 50 of the present invention, assembled as a sandwich of the second border piece 52, interconnect foil 57, first border piece 51, with wire gauzes 65 and 66 in the respective recesses 56, 55 of interconnect formed in border pieces. The wire gauzes need not be bonded to the interconnect foil to form the necessary electrical connection, but they may be bonded if desired. Basically, the construction of the wire gauzes should provide an electrical continuity by having sufficient surfaces that bear against both the cell surface and the interconnect foil surface. This can be accomplished, for example, by having the gauze in a compressed or "sprung" condition in the recesses, so that there is a force that causes the gauze to bear against and form a continuous electrical contact with the cell and interconnect foil surfaces.

FIG. 2A shows the side of the interconnect to be placed adjacent to the cathode surface of a cell. Air (as shown by the arrows) passes from air passages 64, into the cavity 55 of first border piece 51, through the wire gauze 66, and out through other air passages 64 on the opposing border in the interconnect foil 57. The passages for fuel 53 in the first border piece 51 register with the fuel passages 63 in the interconnect foil 57, and are within the sealing surface 67 of the first border piece 51 to be bonded to the cell, so the fuel is sealed from the cathode surface of the cell.

Similarly, FIG. 2B shows the side of the interconnect to be placed adjacent to the anode surface of a cell. Fuel (as shown by the arrows) passes from fuel passages 53 into the cavity 56 of second border piece 52 through the wire gauze 65 and out through other fuel passages 53 on the opposite border. The passages for are 54 are within the sealing surface 68 to be bonded to the cell, so the fuel is sealed from the anode surface of the cell.

Hermetic bonding between the border pieces 51, 52 and the metallic interconnect foil 57 can be achieved by using nickel or copper, paint or foils. That is, the metallic paint can be applied to the border pieces so as to bond to the interconnect foil. It is expected that excellent bonding will be achieved during the first stack-heating run. Alternatively, copper or nickel foils can be used to develop the appropriate bond.

Cell

The SOFC stack comprises individual planar cells comprising a tri-layer structure of anode, electrolyte and cathode. Any suitable cell structure is contemplated for the invention, the only requirement that a cell be sized appropriately, and configured with air and fuel passages and cathode and anode surfaces disposed to function with the interconnect of the invention described above. The cells may otherwise be of any known suitable construction, such as, for example, anode supported, cathode supported, or electrolyte supported. It is within the skill of a practitioner to adapt prior-art cell constructions to the physical requirements of the present invention. For simplicity of manufacture, it is preferred that the anode and cathode surfaces be flat. Since gas flow can be directed by structure of the interconnect, gas flow channels or grooves molded in the surface are generally not required, although the use of such grooved electrodes are not precluded from use in the invention. Among the many suitable cell constructions and compositions that may be structurally adapted for use in the present invention are those disclosed in U.S. Pat. No. 5,543,239, "ELECTRODE DESIGN FOR SOLID STATE DEVICES, FUEL CELLS AND SENSORS" to Virkar et al., U.S. Pat. No. 6,228,521, "HIGH POWER DENSITY SOLID OXIDE FUEL CELL HAVING A GRADED ANODE" to Kim et al., and U.S. Pat. No. 6,106,967 "PLANAR SOLID OXIDE FUEL CELL STACK WITH METALLIC FOIL INTERCONNECT" to Virkar et al, which are hereby incorporated by reference.

In general, the preferred cell constructions are anode-supported cells. Preferably the cell is an anode-supported cell with a supporting anode layer comprising a porous mixture of an electronically conducting material and an oxygen ion conducting material. The cathode layer comprises a porous mixture of an electronically conducting catalyst and an oxygen ion conducting material. Sandwiched between the anode and cathode layers is an electrolyte layer of an oxygen ion conducting material. In an aspect of the invention, the anode layer is between about 100 microns and 3 millimeters, the electrolyte layer is between about 1 micron and 100 microns, and the cathode layer is between about 1 micron and 500 microns. These thicknesses may vary, depending upon the specific construction and composition of the cell. The oxygen ion conduction material is preferably yttria-stabilized zirconia (YSZ), the electronically conducting material in the anode layer is nickel, and the electronically conducting catalyst in the cathode layer is strontium-doped lanthanum manganite (LSM).

EXAMPLE I
Anode-supported Cell

This example illustrates a specific anode-supported cell construction. This example intended to only be illustrative and it is understood that it is within the skill of a practitioner to also construct cathode-supported cell, electrolyte supported cell, or other suitable cell construction.

Two designs of an anode-supported cell can be used. In one, the cell is flat, square or rectangular-shaped without holes. The cell is then bonded to a metallic foil for sealing to other stack components. The metallic foil has requisite holes for the transport of gaseous fuel and air. In the other, the cell is again of a square or a rectangular shape. The difference is that the cell incorporates the holes along the border for the transport of gaseous air and fuel species.

Figure 4:
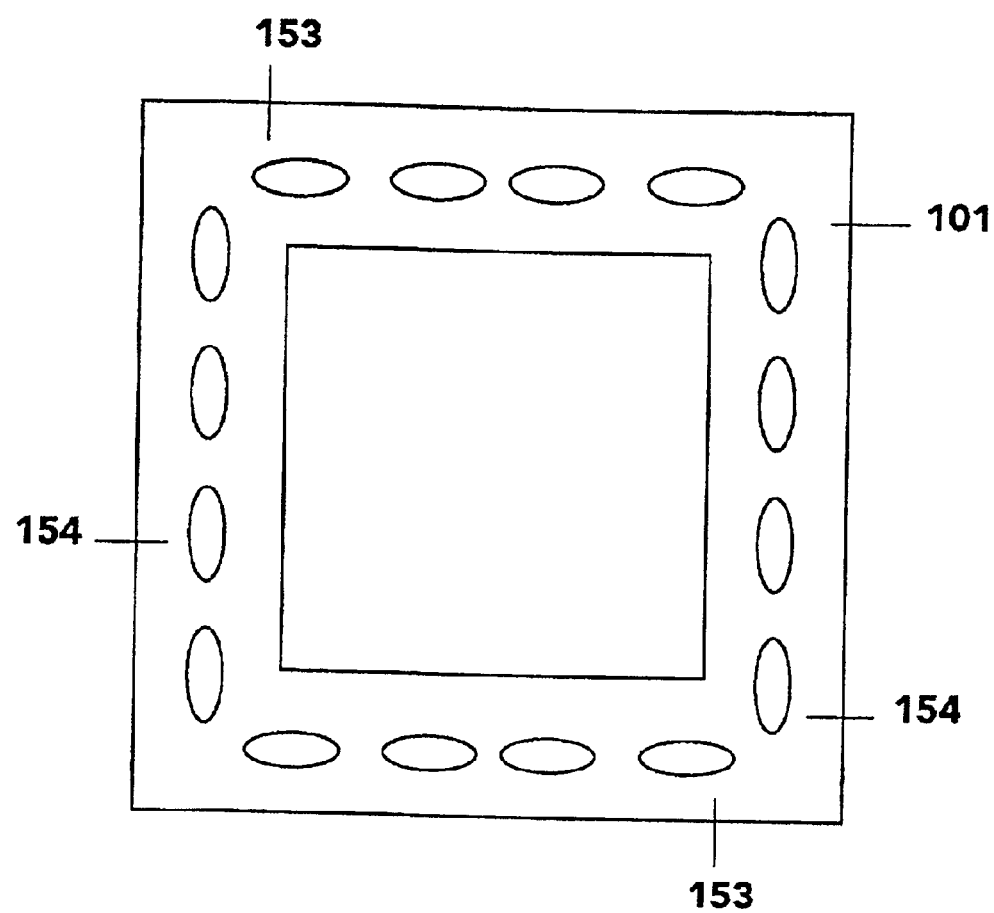
FIG. 4 is a schematic of a metal foil cutout.
Figure 5:
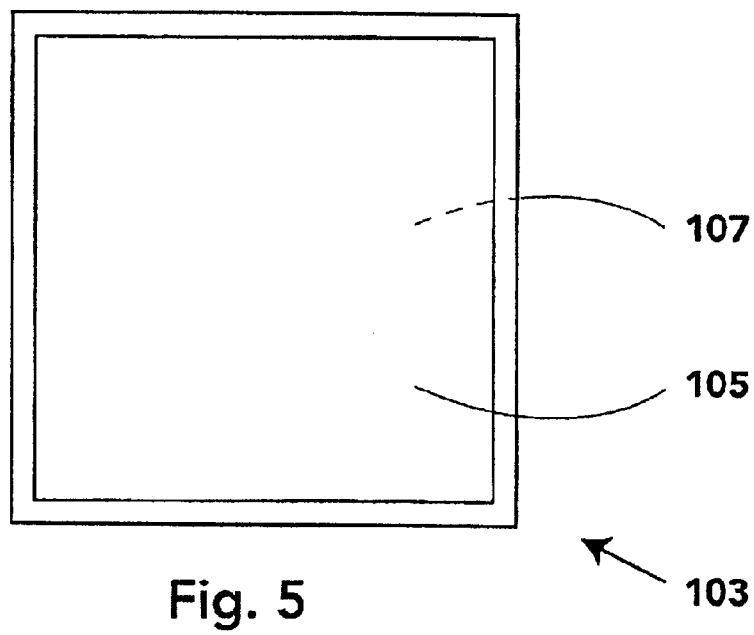
FIG. 5 is a schematic of an anode-supported cell.
Figure 6:
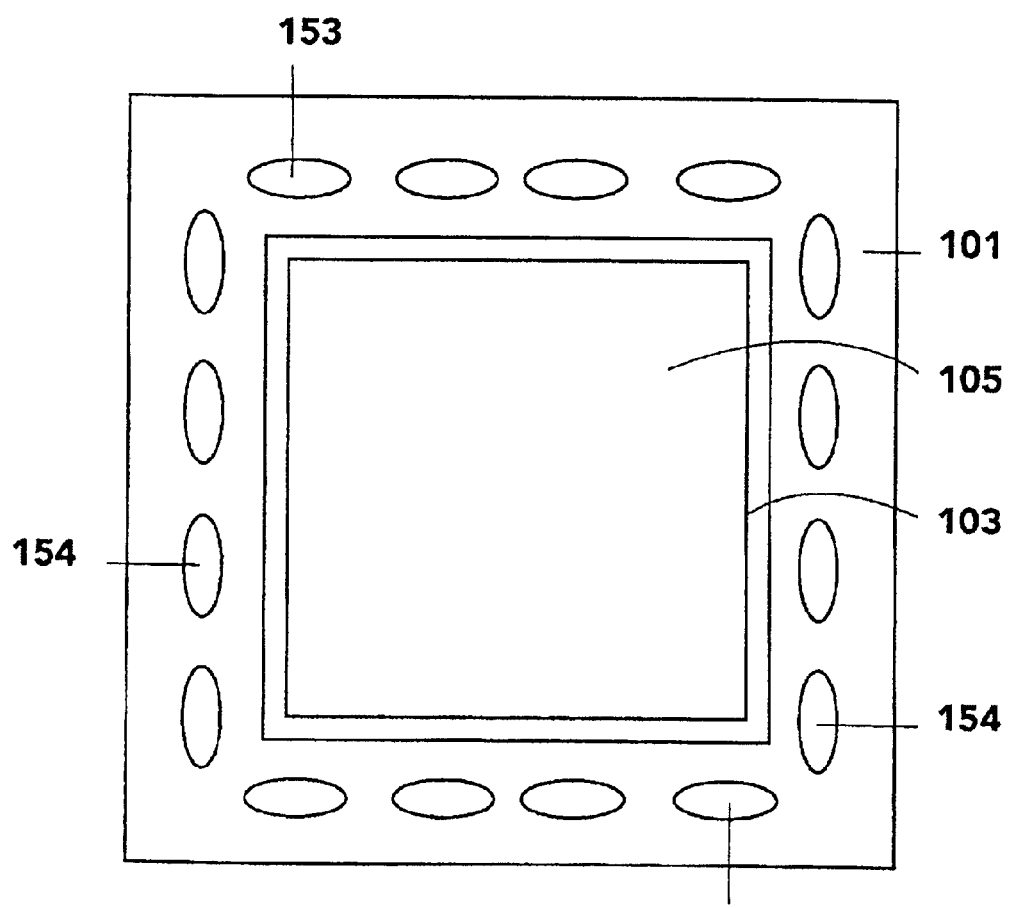
FIG. 6 is a schematic showing a cell bonded to a metallic foil.
Figure 7:
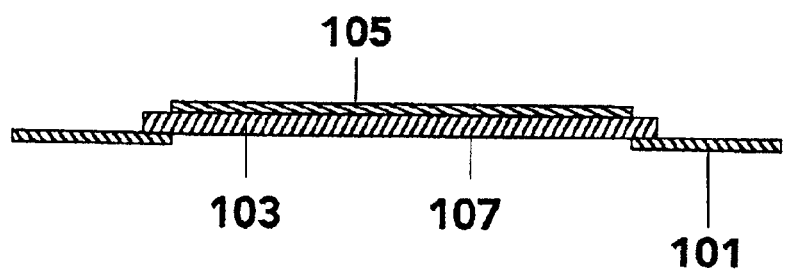
FIG. 7 is a schematic cross-section of an anode-supported cell bonded to a metallic foil.

First, the cell design with no holes in the cell itself is described by reference to FIGS. 4 to 10. An anode-supported cell is bonded to an oxidation-resistant foil (could be Haynes 230 or a similar alloy) cutout, or to a silver foil cutout. FIG. 4 shows a schematic of the foil 101. FIG. 5 shows an anode-supported cell 103, showing the side with the cathode surface 105. The anode surface 107 on the other side. The borders of the cell on the anode side 107 are painted with copper or nickel or silver paint. The cell is then positioned on the foil cutout 101. FIG. 6 shows a schematic of an anode-supported cell,. FIG. 7, is a cross-section through FIG. 6 at B—B. These the cell 103, mounted on the foil 101 with anode side 107 and cathode side 105. During the first heating run, the cell should bond hermetically to the foil 101. The foil 101 has holes 153, 154 along the border to match those in the interconnect for the transport of fuel and air, respectively. An sealing/insulating gasket 109. such as a mica gasket, shown schematically in FIG. 8, can be placed on the top of the cell to provide a sealing surface as well as an electrically insulating surface.

Figure 9:
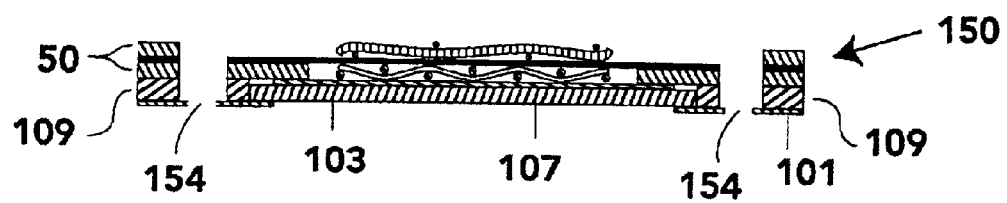
FIG. 9 is a schematic showing a cross-section of an anode-supported cell/interconnect repeat unit, using the cell of FIG. 6.
Figure 10:
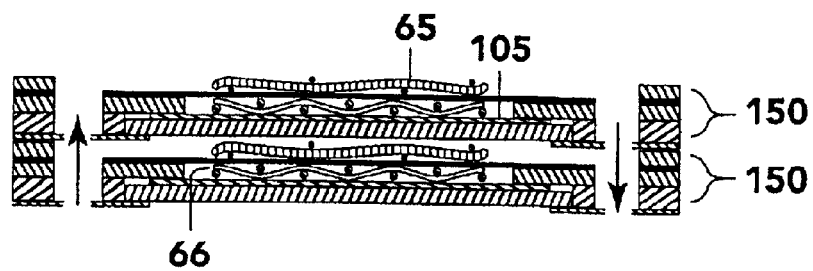
FIG. 10 is a schematic showing two repeat units as in FIG. 9, stacked one on top of the other.

FIG. 9 is a schematic of a cross-section of a cell-interconnect repeat unit 150, which is an assembly on an interconnect 50 as described in FIGS. 1 to 3, combined with cell 103 mounted on the foil, with sealing/insulating gasket 109. FIG. 10 is also a cross-section showing two repeat units. In an SOFC stack, several such repeat units would be assembled in this matter. Air passes through the gauze 66 across the cathode side 105, while fuel passes through gauze 65 across the anode side 107.

EXAMPLE II
Anode Supported Cell

Figure 8:
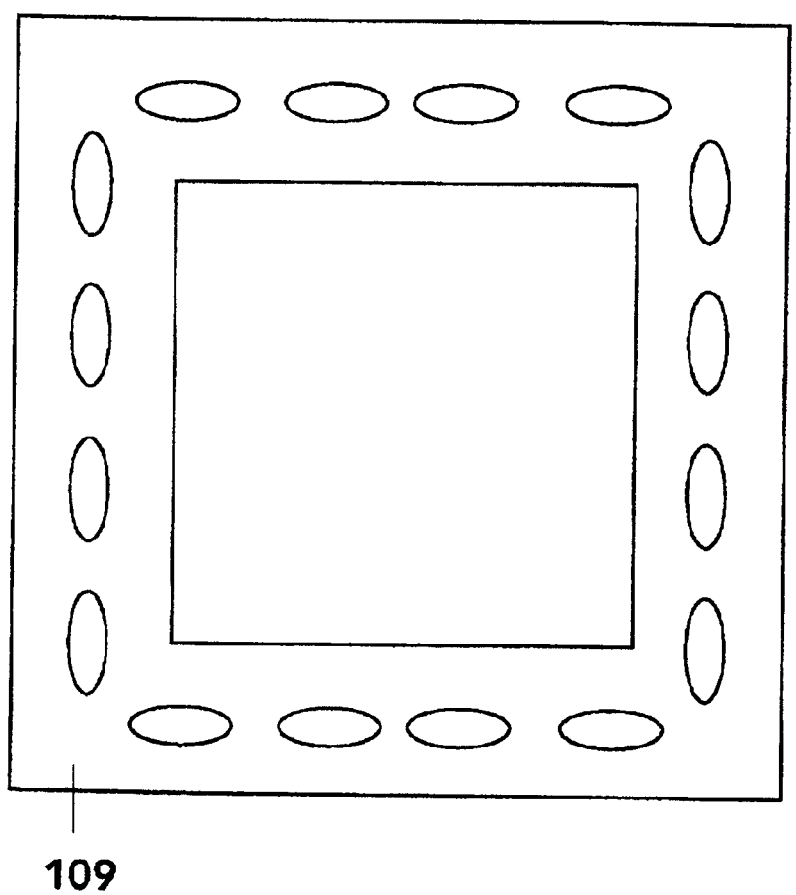
FIG. 8 is a schematic of an electrically insulating gasket.
Figure 11:
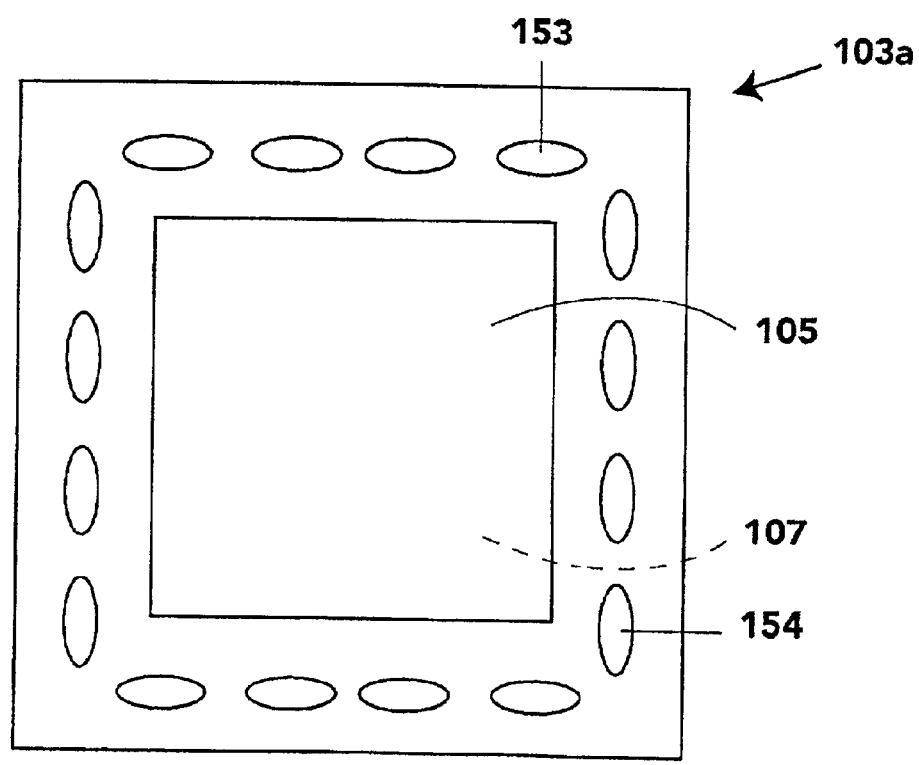
FIG. 11 is a schematic showing an anode-supported cell with cathode painted on it and border holes.

An alternative approach consists of making a cell in such a way that the cell 103a itself has holes along the border, with cathode applied in the central region. Reference is made to the schematic shown in FIG. 11, showing a anode-supported cell, with anode side 107, painted-on cathode 105, and holes 153, 154, for fuel and air passage. This cell 103a can be stacked in series along with an interconnect to form a cell assembly, in a similar fashion that the cell in FIG. 6 is stacked in series in FIGS. 9 and 10. The cell assembly in FIG. 6 does require the gasket 109 to seal the metal foil 101, which is not required for the cell 103a in FIG. 11. Accordingly, the difference between the stack of FIG. 10 and a stack with cells 103a, would be that cell component 103a would replace the cell assembly of the foil 101, anode 103 and mica gasket 109. A mica gasket 109 as shown in FIG. 8 may be used, but it is not a requirement.

The preceding figures and discussion have described a method of an interconnect design and a strategy for stacking planar solid oxide fuel cells and configure them into stacks. Since both the cells and the main component of the interconnect are flat with no grooves or channels, the cost of processing is expected to be considerably lower than the conventional approach, which requires that either the cell or the interconnect have grooves or corrugations incorporated in them. In addition, this design of interconnect also allows for the use of wire gauzes, meshes or grids on the anode and the cathode side to be of entirely different materials.

EXAMPLE III
Test of SOFC Stack

Figure 12:
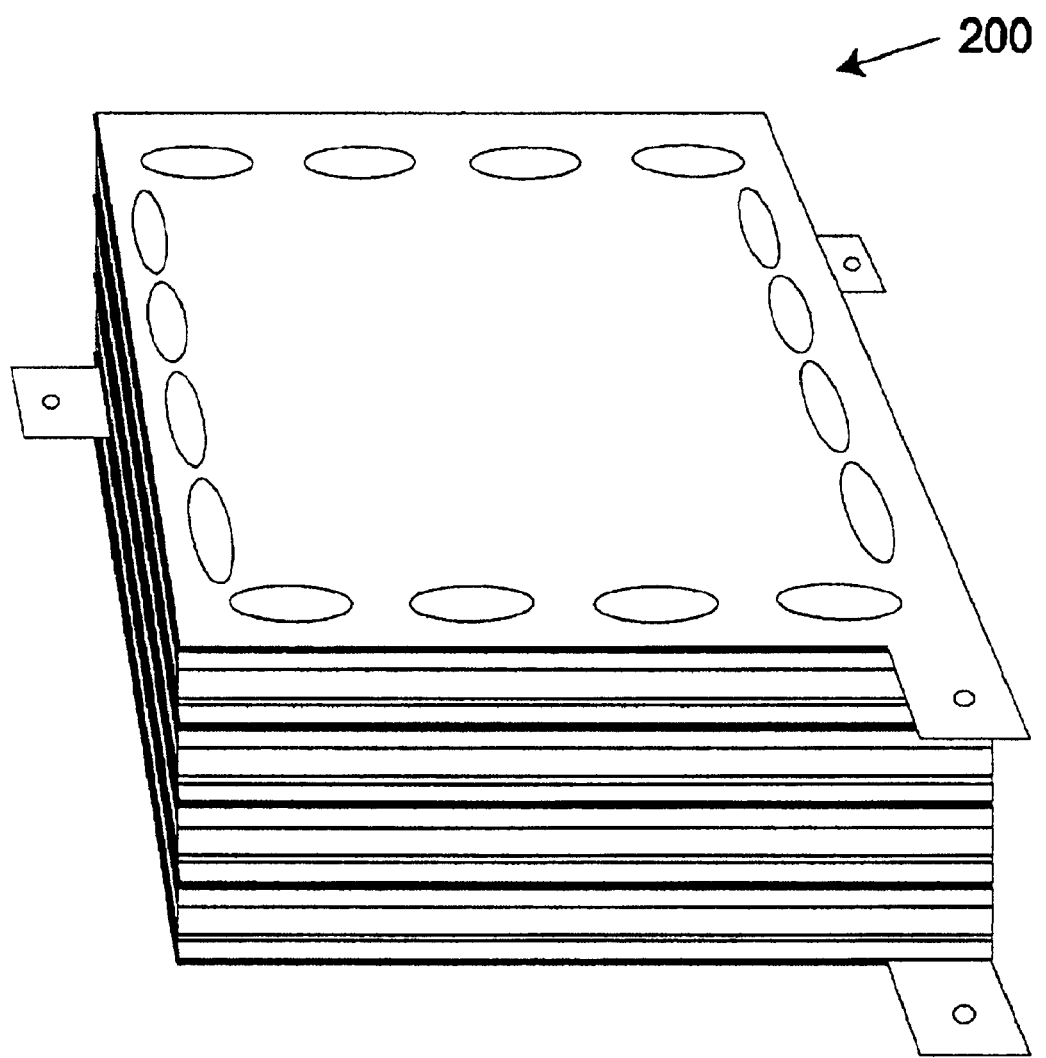
FIG. 12 is a perspective schematic view of a four cell SOFC stack.
Figure 13:
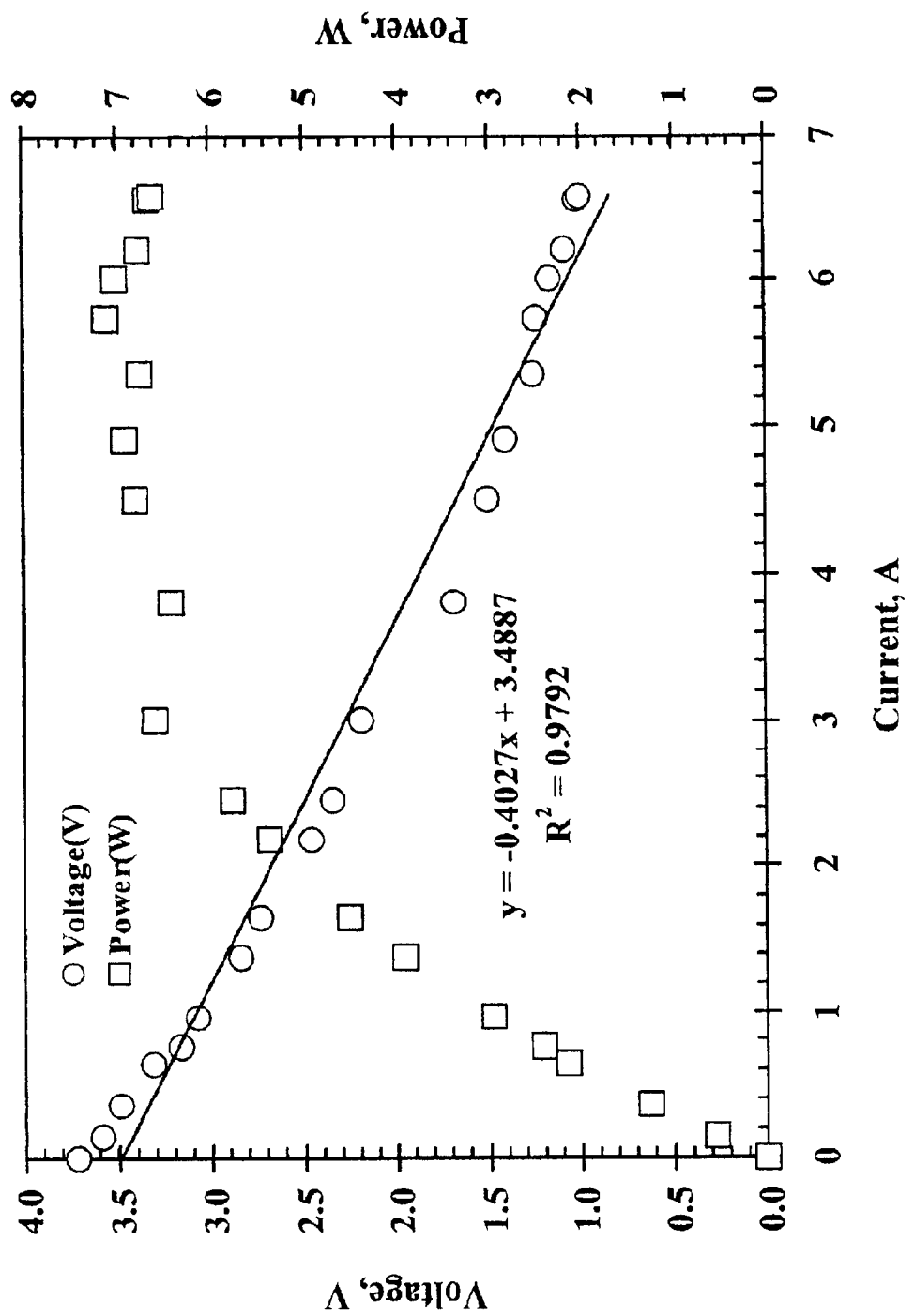
FIG. 13 is a graph showing results of testing a four-cell stack at 800° C. with hydrogen as fuel, and air as oxidant.

An anode-supported cell 200 was made as illustrated in FIG. 12, which shows four cells 103 connected in series. The method of constructions was essentially that described above for FIG. 10. The oxygen ion conduction material was yttria-stabilized zirconia (YSZ), the electronically conducting material in the anode layer was nickel, and the electronically conducting catalyst in the cathode layer was strontium-doped lanthanum manganite (LSM). Except for adaptations to achieve the physical configuration described above, the fabrication techniques, and the composition were according to those known in the art. The cells were made with an active area (cathode surface area) of approximately 2 inches square (5 cm×5 cm.) The thickness of each cell was about 0.35 inches (0.9 mm). The entire cell was about 3 inches square (7.6 cm×7.6 cm). The four-cell stack was tested at 800° C. with hydrogen as the fuel and air as the oxidant. The results, summarized in FIG. 13, show an acceptable performance, comparable to known SOFC stacks of comparable dimensions. Thus, it can be seen that significant economy can be achieved using the more inexpensive and simpler construction of the SOFC stack of the invention while achieving the performance of the more expensive and complicated systems of the prior-art.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. An interconnect for series connecting an anode surface of a planar fuel cell to a cathode surface of an adjacent planar fuel cell, the interconnect comprising:

a first and second border piece, each border piece comprising metal and being generally flat and shaped with an internal cutout shaped such that there is an internal cavity with wide margins on opposing sides of the cavity, within each margin being holes, the holes for the first border piece for the passage of reducing gas, and the holes for the second border piece for the passage of oxidizing gas;

an interconnect foil comprising an electrically conducting material with holes for reducing gas passage and holes for oxidizing gas passage, the interconnect foil constructed and disposed between the first and second border pieces, such that reducing gas passage holes of the interconnect foil are in registration with the reducing gas passage holes of the first border piece and the oxidizing gas passage holes of the interconnect foil are in registration with the oxidizing gas passage holes of the second border piece, such that the reducing gas passage holes of the interconnect foil allow passage of reducing gas into and out of the cavity of the second border piece, and the oxidizing gas passage holes of the interconnect foil allow passage of oxidizing gas into and out of the cavity of the first border piece a first and a second metallic wire gauze disposed respectively in the cavities of the first and second border pieces such that the first wire gauze provides electrical continuity between an anode cell surface and the surface of the interconnect foil and the second wire gauze provides electrical continuity between an cathode cell surface and the surface of the interconnect foil when the interconnect is in a connecting relationship between the fuel cells.

2. The interconnect of claim 1 wherein the holes are elliptical or circular.

3. The interconnect of claim 1 additionally comprising a first and a second metal foil disposed between the interconnect foil and the first and second border pieces, respectively, the first and second metal foils sufficient of the same shape as the first and second border pieces to provide a seal between the interconnect foil and the first and second border pieces, and to provide respective reducing gas and oxygen gas passage holes in registration with the reducing gas and oxygen gas passage holes of the first and second border pieces.

4. The interconnect of claim 3 wherein the first and second metal foil comprise copper or nickel.

5. The interconnect of claim 1 additionally comprising a first and a second metal paint layers disposed between the interconnect foil and the first and second border pieces, respectively, the first and second metal paint providing a seal between the interconnect foil and the first and second border pieces.

6. The interconnect of claim 5 wherein the first and second metal paint layers comprise copper or nickel.

7. The interconnect of claim 1 wherein the metal gauze is in the form of bonded, woven or interlocking wires.

8. The interconnect of claim 7 wherein the metal gauze is in a mesh pattern.

9. The interconnect of claim 7 wherein metal gauze is in a random pattern of interlocking wires.

10. The interconnect of claim 1 wherein the metal gauze is in the form of random inter woven or interlocking wires.

11. A series-connected solid oxide fuel cell stack comprising:

at least two cells disposed relative to each other with adjacent cells for series connection, at least one interconnect providing the series connection between adjacent cells, the at least two cells comprising an anode layer providing an anode layer and comprising a porous mixture of an electronically conducting material and an oxygen ion conducting material a cathode layer providing a cathode surface and comprising a porous mixture of an electronically conducting catalyst and an oxygen ion conducting material, an electrolyte layer of an oxygen ion conducting material disposed between the anode layer and the cathode layer;

the interconnect comprising, a first and second border piece, each border piece comprising metal and being generally flat and shaped with an internal cutout shaped such that there is an internal cavity with wide margins on opposing sides of the cavity, within each margin being holes, the holes for the first border piece for the passage of reducing gas, and the holes for the second border piece for the passage of oxidizing gas;

a interconnect foil comprising an electrically conducting material with border region having holes for reducing gas passage and holes for oxidizing gas passage, the interconnect foil disposed between the first and second border pieces, such that reducing gas passage holes of the interconnect foil are in registration with the reducing gas passage holes of the first border piece and the oxidizing gas passage holes of the interconnect foil are in registration with the oxidizing gas passage holes of the second border piece, such that the reducing gas passage holes of the interconnect foil allow passage of reducing gas into the cavity of the second border piece, and the oxidizing gas passage holes of the interconnect foil allow passage of oxidizing gas into the cavity of the first border piece a first and second metallic wire gauze disposed respectively in the cavities of the first and second border pieces such that the first wire gauze will provide electrical continuity between the anode cell surface and the surface of the interconnect foil and the second wire gauze will provide electrical continuity between the cathode cell surface and the surface of the interconnect foil when the interconnect is in a connecting relationship between the adjacent fuel cells.

12. The solid oxide fuel cell stack of claim 11 wherein the cathode surface and the anode surface are essentially planar flat surfaces.

13. The solid oxide fuel cell stack of claim 11 wherein the anode layer is sufficiently thick to support the cell.

14. The solid oxide fuel cell stack of claim 13 wherein anode layer is between about 100 micron and 3 millimeters, the electrolyte layer is between about 1 micron and 100 microns, the cathode layer is between about 1 micron and 500 microns.

15. The solid oxide fuel cell stack of claim 13 wherein the oxygen ion conducting material is yttria-stabilized zirconia (YSZ), the electronically conducting material in the anode layer is nickel, and the electronically conducting catalyst in the cathode layer is strontium-doped lanthanum manganite (LSM).

16. The solid oxide fuel cell stack of claim 11 wherein the cathode layer is sufficiently thick to support the cell.

17. The solid oxide fuel cell stack of claim 11 wherein the electrolyte layer is sufficiently thick to support the cell.

* * * * *

UNITED STATES PATENT AND TRADEMARK OFFICE
CERTIFICATE OF CORRECTION

PATENT NO. : 6,770,395 B2
DATED : August 3, 2004
INVENTOR(S) : Virkar et al.

It is certified that error appears in the above-identified patent and that said Letters Patent is hereby corrected as shown below:

<u>Title page,</u>
Item [75], Inventor, "Guang-Young Lin" should be -- Guang-Yong Lin --

Signed and Sealed this

Eleventh Day of January, 2005

JON W. DUDAS
*Director of the United States Patent and Trademark Office*